United States Patent [19]

Umezu

[11] 3,914,983
[45] Oct. 28, 1975

[54] LEAK TEST MACHINE AND METHOD OF OPERATION

[75] Inventor: Ichiro Umezu, Koza, Japan

[73] Assignee: Nihon Shinku Gijutsu Kabushiki Kaisha, Chigasaki, Japan

[22] Filed: Mar. 19, 1974

[21] Appl. No.: 453,008

Related U.S. Application Data

[63] Continuation-in-part of Ser. No. 269,406, July 6, 1972, abandoned.

[30] Foreign Application Priority Data

Apr. 26, 1972  Japan.............................. 47-41236

[52] U.S. Cl. ................................................. 73/40.7
[51] Int. Cl.² .......................................... G01M 3/20
[58] Field of Search .......... 73/40.7, 49.2, 49.3, 45.4

[56] References Cited
UNITED STATES PATENTS

| | | | |
|---|---|---|---|
| 2,608,855 | 9/1952 | Jacobs ................................ | 73/40.7 |
| 3,126,734 | 3/1964 | Stutzman ............................ | 73/40 |
| 3,186,214 | 6/1965 | Roberts .............................. | 73/40.7 |
| 3,577,769 | 5/1951 | Roberts .............................. | 73/40.7 |
| 3,762,212 | 10/1973 | Morley et al. ..................... | 73/40.7 |

*Primary Examiner*—Charles A. Ruehl
*Attorney, Agent, or Firm*—Waters, Schwartz & Nissen

[57] ABSTRACT

A method and apparatus for continuous testing of a structure for leak-tightness to gas in which the structure to be tested is placed into a closed chamber such as a belljar and the interior of the chamber and the interior of the structure to be tested are evacuated. A probe gas is then introduced into the interior of the chamber on one side of the structure to be tested. Any gas which leaks through the structure to the other side thereof is conveyed through a conduit to a detector. After the detector has had an opportunity to detect the presence of any leaked gas, the conduit is purged of any leaked gas therein before testing for leak-tightness of a subsequent structure, and also the interior of the chamber and the interior of the structure are evacuated for removal of the probe gas and then subjected to atmospheric pressure in preparation for testing a subsequent structure.

10 Claims, 2 Drawing Figures

3,914,983

LEAK TEST MACHINE AND METHOD OF OPERATION

CROSS-RELATED APPLICATION

This Application is a continuation-in-part of application Ser. No. 269,406 filed July 6, 1972 (now abandoned) and claims the priority of Japanese Application No. 41236/72 filed Apr. 26, 1972.

BACKGROUND

1. Field of Invention

This invention relates to a pressure leak test machine of internal or external pressure type in which a structure to be tested for leak-tightness is placed in a belljar and is supplied with a probe gas, such as helium gas, or the like, from the exterior or the interior thereof. The invention also relates to the testing method.

2. Prior Art

It has been found in the conventional leak text machines that when a gas which has been leaked and is led to a detecting machine through a conduit, the gas can remain within the conduit even after the operation of the detecting machine has been completed and thereby the detecting machine has a detection error during the next operation thereof with a subsequent structure to be tested.

SUMMARY OF THE INVENTION

An object of this invention is to provide a continuous leak test machine and associated method which is free from the above deficiency.

According to the invention, a test machine is provided which comprises a belljar containing a structure whose leak-tightness to gas is to be investigated, means for evacuating the interior of the belljar and said structure to be tested, means for supplying a probe gas within the belljar on one side of the structure to be tested, means for collecting any gas which is leaked through the structure to the other side thereof, detecting means for indicating the presence of leaked gas on the other side of the structure, conduit means for conveying the leaked gas to the detecting means and sweep evacuation means coupled to said conduit means for purging the interior of the conduit means by sweep evacuation with a gas after an operation of the detecting means and prior to the next operation thereof with a subsequent structure.

The invention also contemplates a method comprising introducing the structure to be tested into a closed chamber, evacuating the interior of the chamber and the interior of the structure to be tested, supplying a probe gas into the interior of the chamber on one side of the structure to be tested, conveying any gas which leaks through the structure to the other side thereof through a conduit to a detector, and purging the conduit of any leaked gas therein before testing for leak-tightness of a subsequent structure.

DETAILED DESCRIPTION

Figure 1:
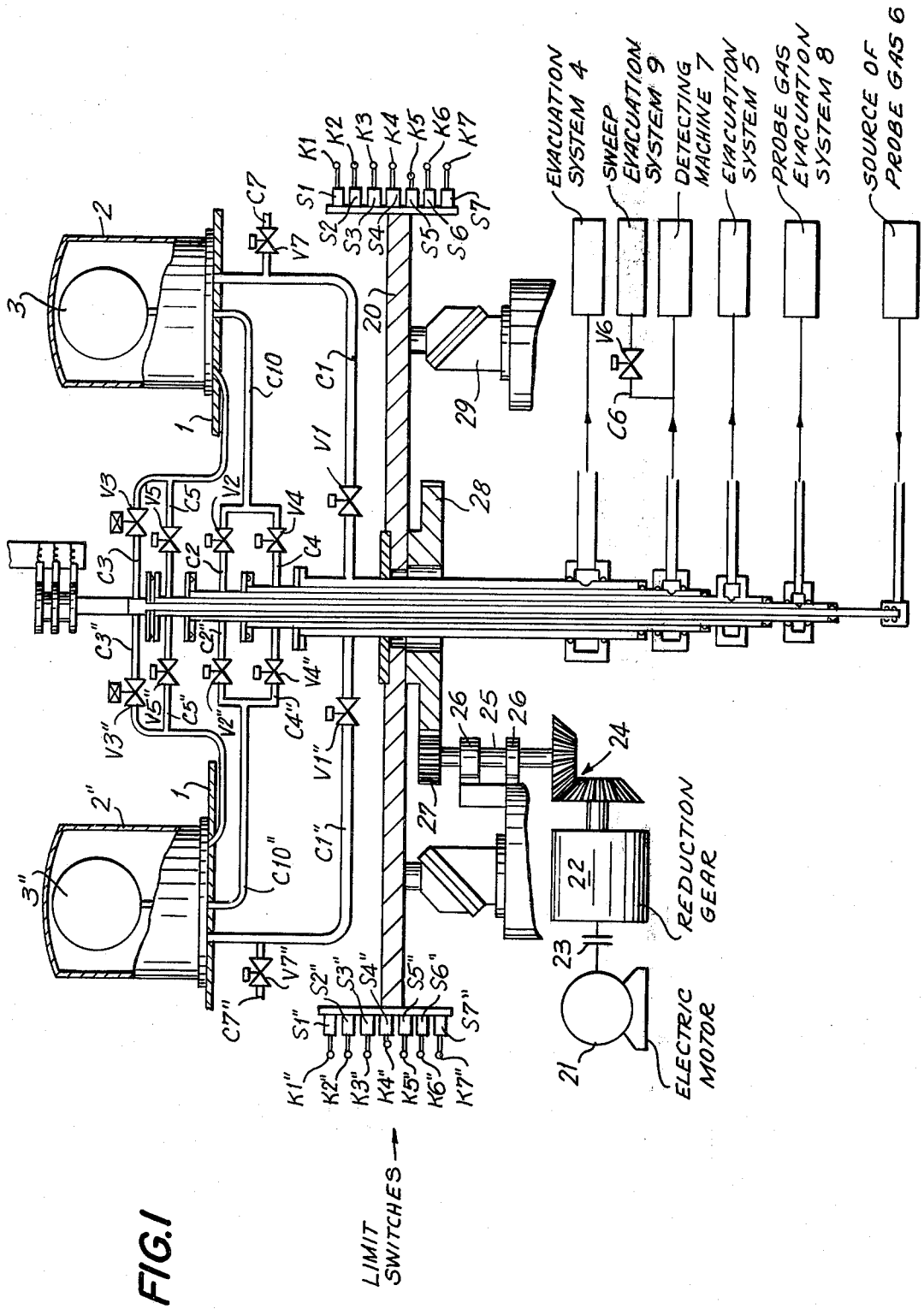
FIG. 1 is a sectional side view of one embodiment according to this invention, and FIG. 2 diagrammatically illustrates the cycle of operation thereof.

Referring to the drawing, numeral 1 denotes a fixed table carrying a plurality of belljars, for example, four belljars 2, 2', 2'', 2'''. Structure 3, 3', 3'', 3''' to be tested for gas leaktightness are contained in the belljars. A stationary portion below the table 1 is provided with a belljar evacuation system 4 comprising an oil rotary pump, an evacuation system 5 comprising a mechanical booster and an oil rotary pump, a probe gas source 6 comprising a tank containing a probe gas, such as, helium gas under pressure, a probe gas detecting machine 7 and a probe gas withdrawal evacuation system 8 comprising an oil rotary pump. The systems 4–8 are connected to the belljars 2, 2', 2'', 2''' and the structures 3, 3', 3'', 3'''. Additionally, the stationary portion is provided with a sweep evacuation system 9 comprising a combination of an oil diffusion pump and an oil rotary pump.

The foregoing arrangement will be first explained in detail with regard to the belljar 2 and the structure 3.

The interior of the belljar 2 is connected to the belljar evacuation system 4 through a first conduit $C_1$ having a first valve $V_1$, and the interior of the structure 3 is connected to the evacuation system 5 through a second conduit $C_2$ having a second valve $V_2$. Additionally, the interior of the belljar 2 is connected to the probe gas source 6 through a third conduit $C_3$ having a third valve $V_3$, and the interior of the structure 3 is connected to the detecting machine 7 through a fourth conduit $C_4$ having a fourth valve $V_4$. The conduits $C_2$ and $C_4$ are connected in parallel and joined to conduit $C_{10}$ which extends through table 1 and is connected to a chamber in structure 3 whose leak-tightness is to be determined. The structure 3 can be independently supported by conduit $C_{10}$ or it can rest on table 1, as desired. The interior of the belljar 2 is also connected to the withdrawal evacuation system 8 through a fifth conduit $C_5$ having a fifth valve $V_5$. Furthermore, the interior of the fourth conduit $C_4$ connected to the detecting machine 7 is connected to the sweep evacuation system 9 through a sixth conduit $C_6$ having a sixth valve $V_6$, and the interior of the belljar 2 is connected to the atmosphere through a seventh conduit $C_7$ having a seventh valve $V_7$, the conduit $C_7$ being connected to conduit $C_1$.

The above arrangement is of the external pressure type wherein the probe gas is applied to the structure 3 from the exterior thereof. The arrangement, however, can be changed to an internal pressure type by a modification in which the third conduit $C_3$ is connected to the interior of the structure 3 while the conduit $C_{10}$ is opened into the interior of the belljar 2.

Substantially the same connection is also made with regard to the other belljars 2', 2'', 2''' and structures 3', 3'', 3''', but there will now be simply explained only the arrangement in respect to the belljar 2'' and the structure 3''. Namely, as shown clearly in FIG. 1, the interior of the belljar 2'' is connected to the belljar evacuation system 4, the probe gas source 6, the withdrawal evacuation system 8 and the atmosphere through a first conduit $C_1''$ having a first valve $V_1''$, a third conduit $C_3''$, having a third valve $V_3''$, a fifth conduit $C_5''$ having a fifth valve $V_5''$ and a seventh conduit $C_7''$ having a seventh valve $V_7''$, respectively, and the interior of the structure 3'' is connected to the evacuation system 5 and the detecting machine 7 through a second conduit $C_2''$ having a second valve $V_2''$ and a fourth conduit $C_4''$ having a fourth valve $V_4''$, respectively. The foregoing sixth conduit $C_6$ having the sixth valve $V_6$ is commonly used also in this case for connecting between the interior of the fourth conduit $C_4''$ and the sweep evacuation system 9.

Figure 2:
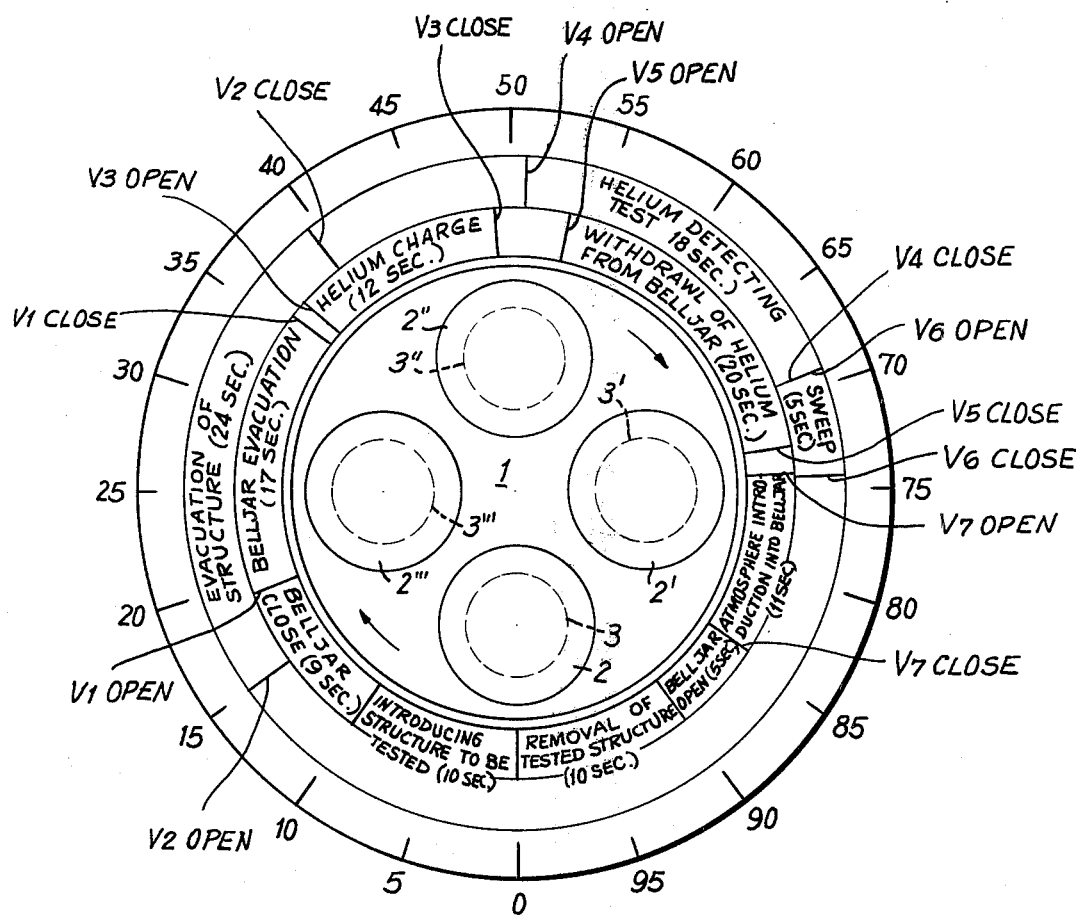

The operation of the apparatus will be explained in regard to the belljar 2 and the structure 3 as follows:

The valves $V_1$ to $V_7$ are arranged to be successively operated to open and close in the course of rotation of a rotor 20 as will be explained more fully later and, for instance, the arrangement is such as shown in FIG. 2, that one cycle of the operation of the valves is effected for one revolution of the table 20 in 100 seconds. The period of from 0 sec. to 10 sec. is used for attaching the structure 3 to conduit $C_{10}$. The subsequent period of from 10 sec. to 19 sec. is utilized for closing the belljar 2. During the subsequent period of from 19 sec. to 36 sec., the first valve $V_1$ is opened and thereby the belljar 2 is evacuated. In the meanwhile, during the period of from 15 sec. to 39 sec., the second valve $V_2$ is opened and thereby the interior of the structure 3 is evacuated. During the subsequent period of from 37 sec. to 49 sec., the third valve $V_3$ is opened and thereby the probe gas is supplied to the external surface of the structure 3 within the belljar 2. If, in this case, the structure 3 has a defect such as a pinhole or the like, the gas leaks therethrough into the interior of the structure 3. During the subsequent period of from 51 sec. to 69 sec., the fourth valve $V_4$ is opened and thereby the leaked gas is led to the detecting machine 7 through the fourth conduit $C_4$ for effecting a predetermined detecting operation. Meanwhile, the fifth valve $V_5$ is opened during the period of from 53 sec. to 73 sec. and thereby the probe gas within the belljar 2 is withdrawn by the system 8. The gas thus withdrawn is returned to the probe gas source 6 for being used again through a return conduit (not illustrated). The gas led to the detecting machine 7 through the fourth conduit $C_4$ remains within the conduit $C_4$ even after the operation of the detecting machine 7 and this residual gas can become a source of erroneous operation of the detecting machine in the next operation with a subsequently tested structure.

By virtue of the following arrangement this disadvantage is obviated. Namely, the sixth valve $V_6$ is opened during the period of from 69 sec. to 74 sec., so that the interior of the conduit $C_4$ is subjected to sweep evacuation and thus it is cleared or purged. Then, the seventh valve $V_7$ is opened during the period of from 74 sec. to 85 sec., and thereby the interior of the belljar 2 is returned to atmospheric pressure, and the belljar 2 is opened during the period of from 85 sec. to 90 sec., and the structure 3 is removed during the period of from 90 sec. to 100 sec., whereupon the belljar is ready for the next cycle of operation.

The same operations are effected in a successively delayed relationship in respect of the belljar 2' and its associated structure 3', the belljar 2'' and its associated structure 3'', and the belljar 2''' and its associated structure 3''', respectively, and the delay in the case illustrated in FIG. 2 is 25 sec. each. Accordingly, the detecting machine 7 effects the detecting operations successively at 25 sec. intervals, and the foregoing sweep evacuation is effected for 5 sec. immediately after each operation.

Thus, according to this invention, the conduit connected to the detecting machine is subjected to a sweep evacuation operation after the operation of the detecting machine and prior to the next operation thereof, so that the foregoing deficiency caused by the leaked gas which has remained from the earlier operation can be eliminated.

Turning now in greater detail to the valve control apparatus, FIG. 1 shows an electric motor 21 which drives a reduction gear mechanism 22 via a clutch 23, the mechanism 22 in turn driving bevel gear coupling 24 which drives an output shaft 25 supported in bearings 26 attached to a fixed support. The shaft 25 carries a pinion gear 27 which meshes with a ring gear 28 fixed to table 20. The table 20 is supported in an annular bearing 29 so as to undergo rotation under the drive of motor 21. The arrangement of the motor and the reduction gear mechanism is such that the table 20 undergoes 1 revolution every 100 seconds. The successive opening and closing of the valves $V_1-V_7$, $V_1'-V_7'$, $V_1''-V_7''$ and $V_1'''-V_7'''$ are effected automatically by the rotation of table 20.

More specifically, limit switches $S_1$ to $S_7$ corresponding to the valves $V_1$ to $V_7$, respectively, are mounted on the peripheral side surface of table 20 for rotation therewith, and actuators $K_1$ to $K_7$ corresponding to the limit switches $S_1$ to $S_7$, respectively, are fixed adjacent the outer peripheral surface of the table 20 in the path of each corresponding one of the limit switches $S_1$ to $S_7$. Each actuator has a position and length corresponding to the time during which the corresponding valve is to be kept open.

As an alternative, the switches can be mounted stationarily around the table 20 and the actuators can be fixed to the periphery of the table 20.

Thus, the turning of the table 20 and the successive opening and closing of the valves $V_1$ to $V_7$ are automatically effected, and thereby the leak test is successively and effectively carried out, in timewise sequence for the four articles mounted on table 1. Of course, any number other than four can be employed, as long as there is correspondence between the rotatable table 20 with its actuators, and the switches and valves.

What is claimed is:

1. A leak test machine comprising a belljar containing a structure whose leak-tightness to gas is to be investigated, means for evacuating the interior of the belljar with said structure to be tested therein, means for supplying a probe gas within the belljar on one side of the structure to be tested, means for collecting any gas which is leaked through the structure to the other side thereof, detecting means for indicating the presence of leaked gas on said other side of the structure, conduit means for conveying the leaked gas to the detecting means, a probe gas evacuation system for evacuating probe gas from the interior of the belljar and sweep evacuation means coupled to said conduit means for purging the interior of the conduit means by sweep evacuation after an operation of the detecting means and prior to the next operation thereof, said sweep evacuation means being operative conjointly with the probe gas evacuation system whereby any probe gas in the conduit means is withdrawn by the sweep evacuation means while the belljar is being evacuated by the probe gas evacuation system.

2. A machine as claimed in claim 1 comprising means for successively testing the leak-tightness of a plurality of structures, said sweep evacuation means and the probe gas evacuation system being operative in the interim between the testing of successive structures.

3. A machine as claimed in claim 2 wherein the means for successively testing the leak-tightness of a plurality of structures comprises a plurality of belljars containing respective structures to be tested, each belljar being respectively supplied with probe gas and having a respective means for collecting any gas leaked through the associated structure.

4. A machine as claimed in claim 3 comprising a fixed structure to which are connected the evacuating means, the probe gas supply means, the leak gas collecting means, the probe gas evacuation system and said conduit means, and a fixed table on which said belljars are mounted.

5. A machine as claimed in claim 1 wherein said sweep evacuation means and said detecting means are connected in parallel to said conduit means.

6. A machine as claimed in claim 5 comprising a valve means controlling communication of the sweep evacuation means and the conduit means.

7. A machine as claimed in claim 1 comprising means for synchronizing the operation of said evacuating means, said probe gas supply means, said collecting means, said detecting means, said probe gas evacuation system, and said sweep evacuating means.

8. A machine as claimed in claim 7 wherein the synchronizing means comprises a rotatable structure, actuators, switch means operated by said actuators in accordance with the rotation of said structure, and valve means coupled to said switch means for being operated thereby to control the sequence of operation of said evacuating means, said probe gas supply means, said collecting means, said detecting means, said probe gas evacuation system and said sweep evacuating means.

9. A method of testing a structure for leak-tightness to gas, said method comprising introducing the structure to be tested into a closed chamber, evacuating the interior of the chamber and the interior of the structure to be tested, supplying a probe gas into the interior of the chamber on one side of the structure to be tested, conveying any gas which leaks through the structure to the other side thereof, through a conduit to a detector, and purging the conduit of any leaked gas therein before testing for leak-tightness of a subsequent structure by simultaneously evacuating said conduit while concurrently removing probe gas from the interior of the chamber and from the interior of the structure being tested via any leaks therein for the testing of a subsequent structure.

10. A method as claimed in claim 9 comprising effecting the leak-tightness testing of a plurality of structures in successively time-phased relation, and effecting the evacuation of the conduit with concurrent evacuation of the interior of the chamber and the interior of the structure being tested in an interim between testing of successive structures.

* * * * *